May 19, 1925.
W. R. COBB
DRIVE MECHANISM
Filed March 8, 1924
1,538,091
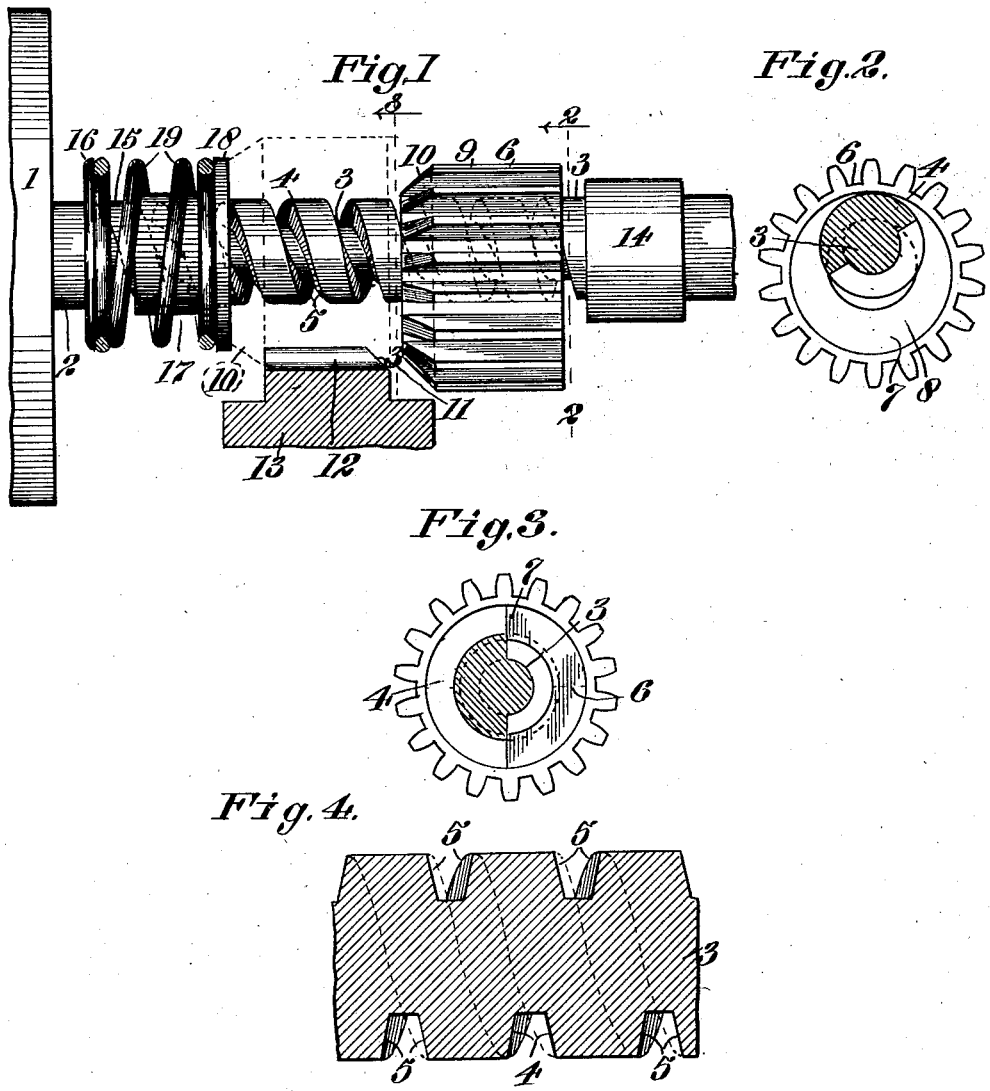

Patented May 19, 1925.

1,538,091

UNITED STATES PATENT OFFICE.

WILLIAM R. COBB, OF BERKELEY, CALIFORNIA.

DRIVE MECHANISM.

Application filed March 8, 1924. Serial No. 697,751.

*To all whom it may concern:*

Be it known that I, WILLIAM R. COBB, a citizen of the United States, residing at Berkeley, in the county of Alameda and State of California, have invented certain new and useful Improvements in Drive Mechanism, of which the following is a specification.

The present invention relates to a power transmitting apparatus of a type wherein it is desired to intermesh driving devices at will for the transmission of power from a prime mover to a driven element.

The embodiment illustrated and described in the present application is of a type designed particularly as an engine starter wherein a prime mover transmits power for the interengaging of driving devices, one of which is illustrated as the fly wheel of an engine.

The object of my invention is to provide a drive of this type wherein all yielding connection between the drive element and the driven element is dispensed with when the two members are in engaging position; and to further provide a drive member movable to and from engaging position with the driven member, and which is capable of limited radial movement when disengaged therefrom, which radial movement facilitates its engagement with the driven member without clashing or grinding when the member is moved into engagement with the driven member. A further object is to provide a yielding stop and retarding device to interrupt movement of the driving member in one direction; and to provide a construction of such type that the driving member assumes what may be termed a floating position during its movement into engaging relation with the driven member.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

To more fully comprehend the invention reference is directed to the accompanying drawings, wherein:—

Fig. 1 is a view in side elevation of one embodiment of my invention illustrating a prime mover, a drive member operated thereby and a driven member in section, the drive and driven members being illustrated in full lines in disengaged relation, and in engaged relation in dotted lines.

Fig. 2 is a vertical sectional view on line 2—2 Fig. 1 illustrating the position of the driving member when the same is in a state of rest disengaged from the driven member.

Fig. 3 is a transverse sectional view on line 3—3 of Fig. 1 illustrating the drive and driven members in engaged relation.

Fig. 4 is a longitudinal sectional view of a portion of a worm shaft supporting the driven member.

Referring to the illustrated embodiment of my invention and wherein like characters of reference designate corresponding parts throughout the drawing, the numeral 1 designates a prime mover, in this embodiment the same being preferably an electric motor. From the armature shaft 2 of the motor extends a screw shaft 3 formed throughout its length with an incut worm or thread 4, the side walls 5 of which are inclined outwardly toward the periphery of the shaft as in Fig. 4 of the drawings. A driving gear 6 is mounted on the shaft 3, and on its interior is formed with a worm thread 7 corresponding to the worm 4 of the shaft, but the interior diameter of the opening 8 in the gear 6 is such as to permit a limited radial movement of the gear about the shaft without permitting the disengagement of the worm thread 7 from the groove 5.

The forward edges of the teeth 9 of the gear 6 are provided with a rearwardly beveled face 10 as clearly illustrated in Fig. 1 of the drawings, and the bevel of these teeth correspond to the bevel 11 of the teeth 12 of driven member 13 which is rotatably mounted with its periphery adjacent the shaft 3, and so that the teeth 12 and 9 intermesh when the gear 6 is disposed concentrically about the shaft 3, as hereinafter described. The end of the shaft 3 opposite the prime mover 1 carries a suitable stop collar or other device 14 for arresting the movement of the gear 6 away from the driven member 13.

To the end of the shaft 3 adjacent the prime mover 1, I secure a member 15 flanged as at 16 and co-operating with said member 15 is a collar 17 slidable longitudinally on the shaft, and the same is provided with a flange 18. Interposed between the flanges 16 and 18 and coiled about the shaft 3 is a spring 19 which is adapted to yield on the engagement of the end of the gear 6 with the flange 18 and affords a yieldable retarding device for the gear 6. At such time as the driving member 6 is in full mesh with the driven member 13, the end of the collar 17 is adapted to contact with the member 15 and arrest further movement of the drive member 6 along the shaft 3, also preventing the complete compression of the spring 19.

Assuming the device to be in a position as in Fig. 1 of the drawings, and it being desired to impart movement from the drive member 6 to the driven member 13, the prime mover 1 is started, and this causes a rotation of the shaft 3. This rotation of the shaft 3 causes a movement of the drive member 6 longitudinally on its shaft in the direction of the driven member 13, it being borne in mind that the shaft 3 is operating at a relatively high speed. As the beveled ends 10 of the teeth 9 approach the ends 11 of the teeth 12, the radial movement of the drive member 6 about the shaft 3 permits of a slight movement of the member 6 on the shaft. This enables a perfect sliding intermeshing, and should the ends of the teeth of the respective drive and driven members clash, the drive member 6 will continue in its movement along the shaft 3 with the non-intermeshing teeth riding one on the edge of the other until the end of the member 6 contacts with the flange 18. The resistance of spring 19 on flange 18 retards further free forward movement of the gear 6 and causes a slight rotation to be imparted thereto by the shaft 3, freeing the riding tooth 9 from the edge of the ridden tooth 12 of member 13 and causing the full engagement of the teeth during the power transmitting operation. This operation takes place whether the driven member is stationary or rotating and without in any way damaging or chipping the teeth of either member. As the drive member becomes substantially fully engaged with the driven member its movement longitudinally of the shaft 3, which has been arrested by the contact of its forward end with the flange 18, is stopped by the engagement of the end of the collar 17 with the member 15. The driven member 13 after being started and the prime mover 1 shut off an increase of speed of the driven member 13 causes a rearward movement of the drive member 6 on the shaft 3 until the same disengages from the driven member and contacts with the stop 14 where it remains until such time as the prime mover 1 is again operated.

It will be understood that the drive member 6 normally eccentrically disposed on the shaft 3 is moved to concentric or central position thereon by the yieldable stop 18 which creates a pressure on the end of the member 6 when the member contacts therewith. This pressure is in turn transmitted to the wall 5 of the member 4 by the interior thread 7 on the member 6 causing the pinion 6 to move radially on the shaft 3 until said pressure is equally distributed about the same, causing a centering of the pinion on the shaft.

I claim:

1. In combination with a toothed driven member, a rotatable toothed driving member axially movable into and out of engagement therewith, said toothed driving member having a limited radial movement substantially equal to the depth of the teeth of the driving member when disengaged from the driven member to facilitate its engagement therewith.

2. In combination with a toothed driven member, a rotatable toothed driving member axially movable into and out of engagement therewith, said toothed driving member having a limited radial movement corresponding to the depth of its teeth when disengaged from the driven member to facilitate its engagement therewith, and yielding means for arresting the movement of the driving member on the engagement of the driving member with the driven member.

3. In combination with a rotatably mounted screw shaft, a peripherally toothed driving member operatively threaded on the same for longitudinal movement, rotary movement therewith, and limited radial movement thereon a distance substantially equal to the depth of its teeth, and a rotatable driven member with which said driving member is adapted to have driving engagement when advanced longitudinally on its shaft.

4. In combination with a rotatably mounted screw shaft, a peripherally toothed driving member having screw threaded connection with the shaft operative throughout its length, said member capable of limited radial movement substantially corresponding to the depth of the peripheral teeth about the shaft, of movement longitudinally on the shaft, and of rotation with the shaft, a rotatable driven member with which said driving member is adapted to have driving engagement when advanced longitudinally on the shaft, the radial movement of the driving member on the shaft facilitating the engagement of the driving and driven members.

5. In combination with a screw shaft of uniform diameter throughout its length mounted for rotation, a peripherally toothed driving member loosely threaded thereon for limited independent radial movement substantially corresponding to the depth of the peripheral teeth, said driving member adapted for longitudinal movement thereon and rotary movement therewith, a rotatably driven member with which said driving member is adapted to have driving connection when advanced longitudinally on its shaft, and a yieldable stop for arresting the engaging movement of the driving member.

6. In combination with a toothed driven member, a cooperatively disposed screw shaft, a toothed driving member operatively threaded on said shaft for rotative and longitudinal movement into engagement with the driven member and for rotation with the shaft, the said driving member movable radially on the shaft a distance corresponding to the depth of its teeth assuming a position eccentrically of the shaft when at a state of rest and concentrically thereof when in driving engagement with said driven member.

7. In combination with a toothed driven member and a cooperatively disposed screw shaft, a peripherally toothed driving member mounted for operative interengaging axial and longitudinal movement on said shaft for its full length, and of limited radial movement equal to the depth of the peripheral teeth about the same to facilitate its engagement with the driven member, said driving member assuming a position eccentrically of the shaft when disengaged from the driven member.

8. In combination with a rotatably mounted shaft provided with a spiral groove, an interiorly threaded peripherally toothed driving member mounted thereon with the threads of the member and shaft operatively interengaging, said driving member being of an inside diameter less than the outside diameter of the shaft adapting it for limited radial movement on said shaft without interrupting the worm connection between said member and shaft, and a driven member with which the driving member engages when advanced along the shaft, the radial movement of the driving member on the shaft facilitating the engagement of the driving and driven members.

9. In combination with a rotatably mounted shaft provided with a spiral groove, an interiorly threaded peripherally toothed driving member mounted thereon with the threads of the member and shaft interengaging, said driving member adapted for limited radial movement on said shaft corresponding substantially to the depth of the peripheral teeth, a driven member with which the driving member engages when advanced along the shaft, the radial movement of the driving member on the shaft facilitating the engagement of the driving and driven members, and a yieldable stop for resisting the movement of the driving member in one direction on the shaft.

10. In combination with a screw shaft of uniform diameter throughout its length mounted for rotation, a driving member loosely threaded thereon for limited independent radial movement, said driving member adapted for positive longitudinal operative movement thereon and rotary movement therewith, a rotatably driven member with which said driving member is adapted to have driving connection when advanced longitudinally on its shaft, a member longitudinally slidable on the shaft and with which the driving member contacts upon its engagement with the driven member, and a yielding spring in rear of the longitudinally slidable member and adapted for compressing on the engagement of the driving and driven members.

11. In combination with a pair of toothed members adapted for interengagement by axial movement of one toward the other, a rotatably mounted screw shaft mounting one of said toothed members and on which said member is capable of limited longitudinal movement and about which said toothed member is capable of radial movement corresponding substantially to the depth of its teeth without interrupting the worm connection between the member and shaft, and yielding means for resisting the movement of said toothed member longitudinally of the shaft in one direction.

12. In combination with a pair of toothed members adapted for inter-engagement by axial movement of one toward the other, a rotatable shaft mounting one of said toothed members and of an outside diameter larger than the inside diameter of said toothed member, and on which said member is capable of limited longitudinal movement, and about which said toothed member is capable of radial movement without interrupting the screw connection between said member and shaft, and means for resisting the movement of said toothed member longitudinally of its shaft in one direction.

In testimony whereof I have signed my name to this specification.

WILLIAM R. COBB.